(12) United States Patent
McDonough et al.

(10) Patent No.: US 7,839,762 B2
(45) Date of Patent: Nov. 23, 2010

(54) METHOD AND APPARATUS FOR VECTOR BASED WALSH CODE BIT SEQUENCE GENERATION

(75) Inventors: John G. McDonough, La Jolla, CA (US); Douglas R. Walby, San Diego, CA (US); Karim Abdulla, Cardiff, CA (US)

(73) Assignee: Texas Instruments Incorporated, Dallas, TX (US)

( * ) Notice: Subject to any disclaimer, the term of this patent is extended or adjusted under 35 U.S.C. 154(b) by 2586 days.

(21) Appl. No.: 10/121,467

(22) Filed: Apr. 11, 2002

(65) Prior Publication Data
US 2003/0117942 A1 Jun. 26, 2003

Related U.S. Application Data

(60) Provisional application No. 60/342,948, filed on Dec. 21, 2001.

(51) Int. Cl.
*H04J 11/00* (2006.01)
(52) U.S. Cl. .................................................... 370/209
(58) Field of Classification Search ................ 370/209, 370/208; 375/130
See application file for complete search history.

(56) References Cited

U.S. PATENT DOCUMENTS

| | | | | |
|---|---|---|---|---|
| 5,311,176 A | * | 5/1994 | Gurney | 341/50 |
| 5,515,396 A | * | 5/1996 | Dalekotzin | 375/142 |
| 5,630,088 A | * | 5/1997 | Gupta et al. | 711/207 |
| 5,751,761 A | * | 5/1998 | Gilhousen | 375/146 |
| 6,198,719 B1 | * | 3/2001 | Faruque et al. | 370/209 |
| 6,208,615 B1 | * | 3/2001 | Faruque et al. | 370/209 |
| 6,212,219 B1 | * | 4/2001 | Shou et al. | 375/130 |
| 6,496,474 B1 | * | 12/2002 | Nagatani et al. | 370/208 |
| 6,671,251 B1 | * | 12/2003 | Kim et al. | 370/209 |
| 6,707,846 B1 | * | 3/2004 | Iwamatsu | 375/150 |
| 6,708,330 B1 | * | 3/2004 | Moberg et al. | 717/158 |
| 6,865,177 B1 | * | 3/2005 | Park et al. | 370/350 |
| 6,956,890 B2 | * | 10/2005 | Lattuca et al. | 375/140 |
| 6,985,516 B1 | * | 1/2006 | Easton et al. | 375/150 |
| 2003/0118050 A1 | * | 6/2003 | McDonough et al. | 370/470 |

* cited by examiner

*Primary Examiner*—Chi H Pham
*Assistant Examiner*—Mohammad S Adhami
(74) *Attorney, Agent, or Firm*—Ronald O. Neerings; Wade James Brady, III; Frederick J. Telecky, Jr.

(57) ABSTRACT

A vector-based Walsh code sequence generator provides for a general architecture that can be easily adapted to any random length sequence and any random number of bits per access. The Walsh code sequence generator can produce a new access on every hardware clock cycle, thereby maximizing the efficiency of the bit sequence requesting process.

15 Claims, 3 Drawing Sheets

METHOD AND APPARATUS FOR VECTOR BASED WALSH CODE BIT SEQUENCE GENERATION

This application claims priority under 35 USC §119(e)(1) of provisional application Ser. No. 60/342,948, filed Dec. 21, 2001.

TECHNICAL FIELD

This invention relates in general to the field of radio communications and more specifically to a method and apparatus for vector-based Walsh code bit sequence generation.

BACKGROUND

In modern Direct Sequence Spread Spectrum (DSSS) communication systems, the Walsh coding schemes used may vary from one operational mode to another and from one network to another. In addition, certain communication devices may be required to operate across multiple networks that have adopted different Walsh coding standards (i.e., multi-mode operation).

As it is desirable to build receivers that may operate in a multitude of different modes and within multiple networks and systems, a flexible and modular method and apparatus for Walsh code generation is desired that will accommodate these schemes in an efficient manner (e.g., having significant sharing of hardware and software resources between the various modes of operation and between different systems). In particular, the ability to efficiently generate Walsh sequences in certain communication systems is desirable.

It is also desirable to provide a flexible and efficient interface to the sequence generator so that the number of sequence bits provided per access can be varied to match the requirements of the requester. Thereby reducing the number of requests per time interval.

DSSS receivers have traditionally been capable of demodulation in only a single or perhaps a few modes of operation and do not typically have the flexibility to accommodate the variety of spreading, modulation and coding schemes supported by the current invention. For example, mobile station receivers compliant with the TIA/EIA-IS-95-B standard are required to generate only 64-bit Walsh codes.

Walsh code bit sequences are traditionally generated by replicating a pattern of inverted and non-inverted versions of the next smaller Walsh code as described in the literature. The pattern of such inverted/non-inverted sequences is such that if column and row indexes are applied (in binary format) to each bit in the Walsh matrix, the inverted portion of the larger Walsh matrix is the bits with index values containing a "1" in the most significant bit (MSB) of both the row and the column index numbers. As this concept is extended to longer and longer Walsh codes, the inversion process causes some sections to be repeatedly inverted, so every other time they are inverted the original bit pattern once again appears due to the double inversion. So an algorithm can be applied to this process to determine whether a particular section of a longer Walsh code has been inverted relative to the same section of a shorter Walsh code. Using a Walsh symbol index (row index W) and a specific bit location (column index B) within that particular Walsh symbol, delete the lower order row and column bits up to the number of bits required to index rows and columns in the smaller Walsh table. Therefore, if the longer table is twice the size of the smaller table, only one index bit would remain for the row and column indexes, if the longer table is 4 times the size of the smaller two bits would remain, and so on. With the remaining bits fields, logically AND the row and column indexes together, then count the number of 1's in the result. If that number is odd, the field was inverted (odd number of inversions=inverted), if it is even, the field was not inverted (even number of inversions=not inverted). The counting of the number of 1's can be easily accomplished in logic using Exclusive-OR logic gates.

A need exists in the art for a method and apparatus that can be easily adapted to any random length Walsh code sequence and any random number of bits provided per access. It should also preferably provide the additional benefit of being capable of producing a new access on every clock cycle, thus maximizing the efficiency of the bit sequence requesting process.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
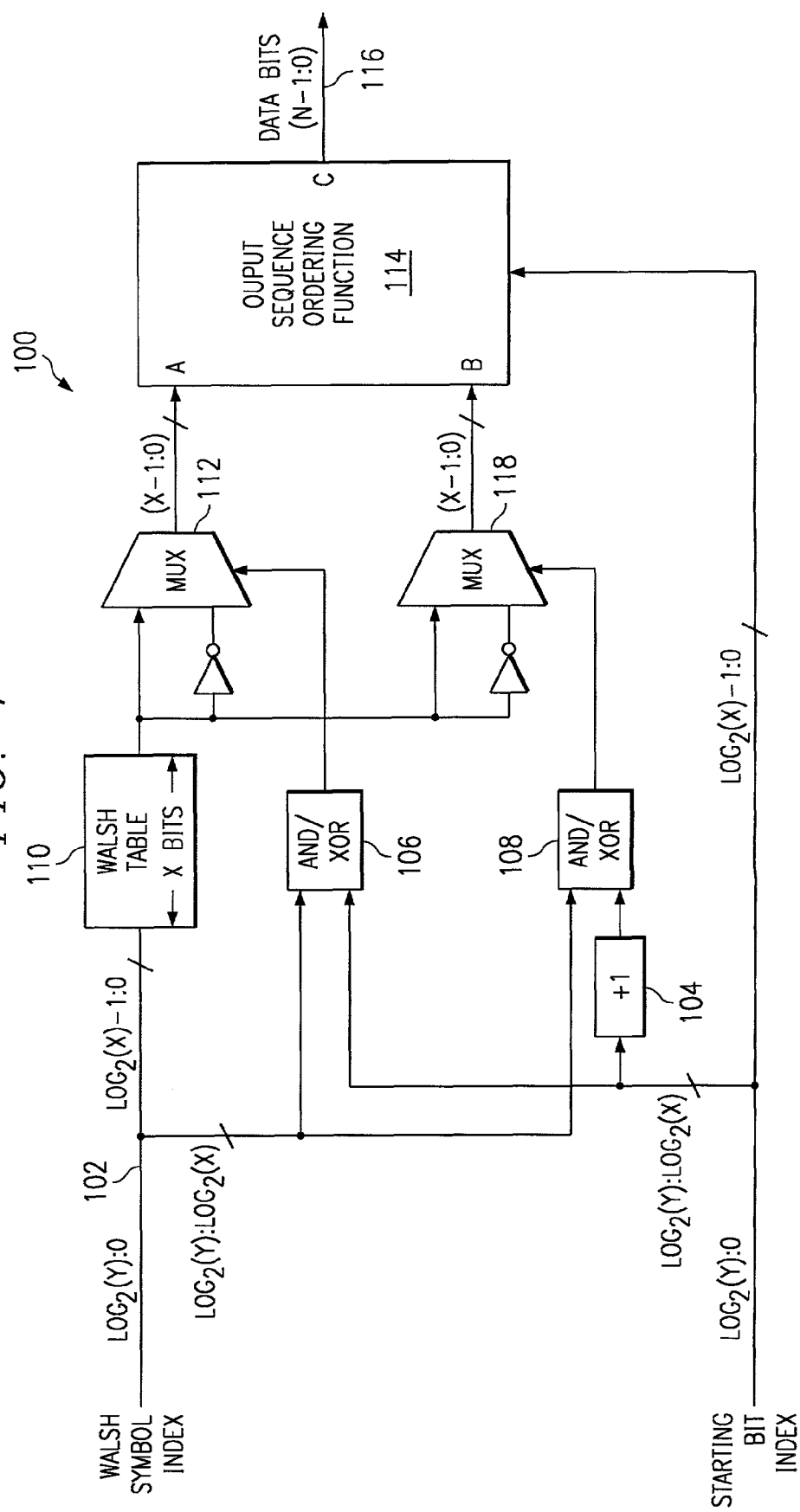
FIG. 1 is a block diagram of a circuit that can output any output vector size (N) from a any particular Walsh code length (Y) sequence in accordance with the invention.

While the specification concludes with claims defining the features of the invention that are regarded as novel, it is believed that the invention will be better understood from a consideration of the following description in conjunction with the drawing figures.

Figure 2:
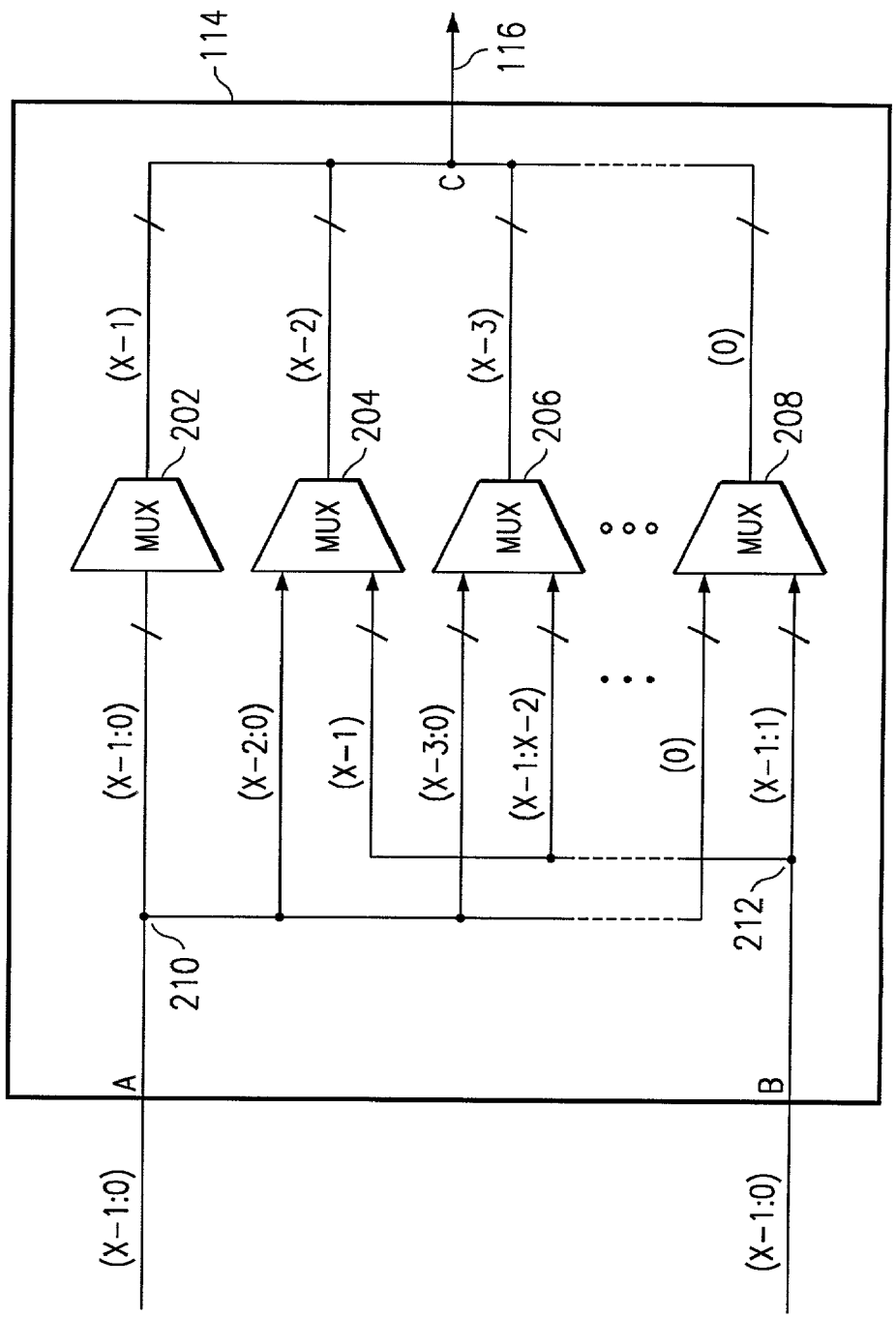
FIG. 2 a more detailed schematic of the output sequence ordering function circuit shown in FIG. 1.
Figure 3:
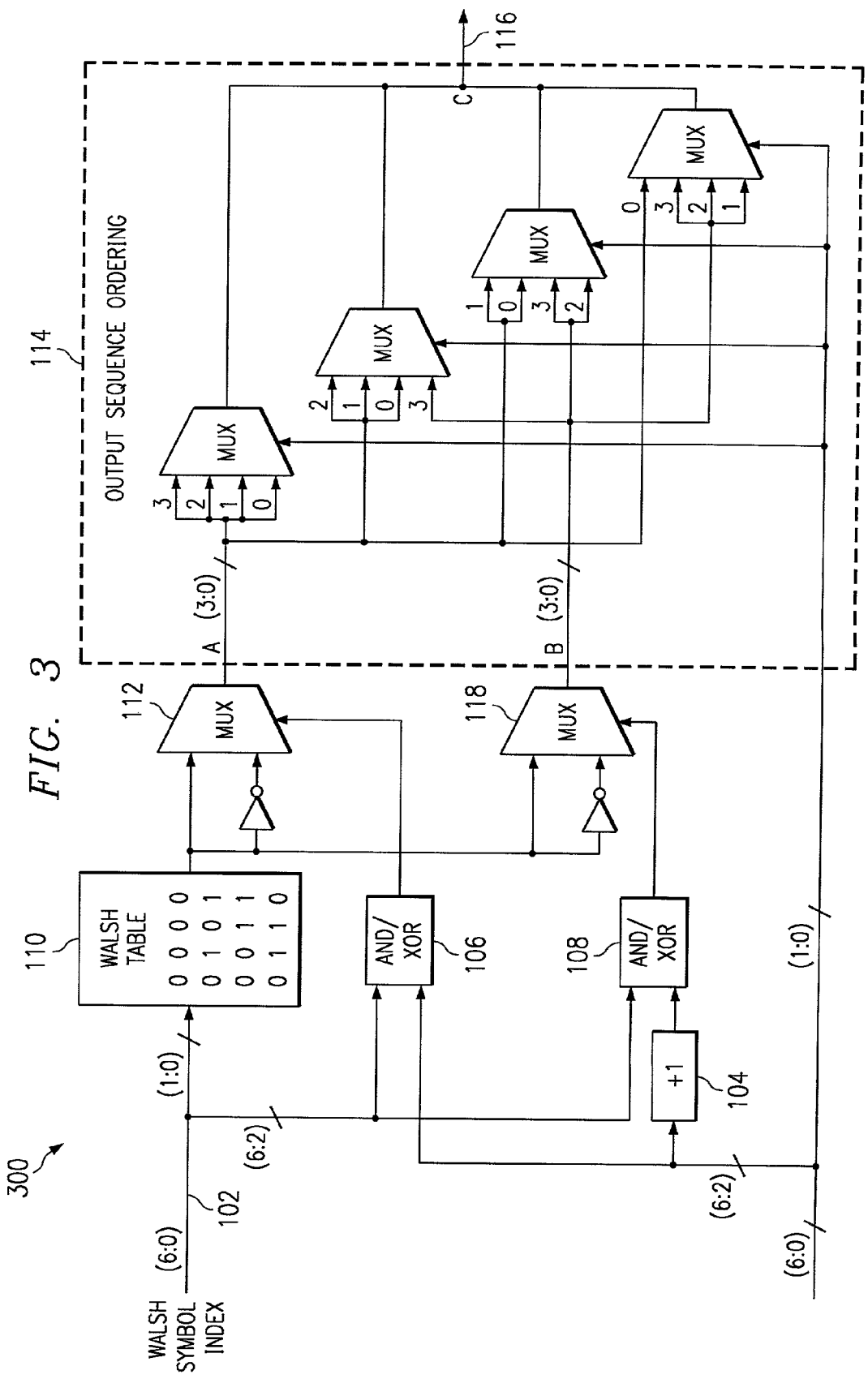
FIG. 3 shows an example of the architecture of the present invention in the particular case of a circuit that can select any 4-bit output vector from a length 128 sequence.

Referring now to the drawings and in particular to FIGS. 1 and 2, there is shown a general architecture for the circuit that can implement any particular Walsh code length (Y) and present that sequence data to the user using any output vector size (N). In FIG. 3, there is shown a specific implementation where the Walsh code length has been chosen to be 128 bits and the output vector size is 4 bits.

It is a goal of the present invention to utilize the smallest Walsh table possible to keep hardware gate counts to a minimum. The preferred embodiment requires implementation of an X by X Walsh matrix, where X is a power of 2 that is greater or equal to N.

The incoming bits in the Walsh sequence 102 shown in FIG. 1 are stored in a Walsh storage table such as a read-only memory (ROM) 110 starting at Walsh code 0 in address 0 and incrementing up to Walsh code X−1 at address X−1. Depending on the size of the Walsh table 110 needed, different types of hardware storage (e.g., ROM, registers, etc.) can be utilized as is known in the art in order to provide optimum design (e.g., cost effectiveness, current drain, etc.).

A fundamental property of Walsh codes is that they are always X by X matrices, and X is a power of 2, so an X-bit Walsh code table will always have exactly X entries addressed from 0 to X−1. In the case of small Walsh tables, the output values can be decoded in logic gates from the address value rather than being implemented in ROM, since a ROM implementation only becomes practical with large tables.

The lower $\log_2(X)$ bits of the Walsh symbol index 102 determines which of the Walsh codes is addressed in the table. The X-bit table 110 output value is manipulated using multiplexers 112 and 118 which are under the control of logic circuits 106, 108 in order to generate a sequence of 2X bits which are input to the A and B input ports of the output sequence ordering function circuit 114. Then an N-bit sequence is extracted from the 2X-bit sequence and provided to the output port 116 by the output sequence ordering function circuit 114 shown in more detail in FIG. 2.

It is most efficient to extract X bits per access, since that is the maximum number of bits available per access, but it is not necessary that N be equal to X. The multiplexer-based output sequence ordering function circuit 114 has its connections arranged such that any of the sequences in the 2X-bit sequence may be selected and provided to the output port 116. The particular ordering is based on the lower $\log_2(X)$ bits of the starting bit index value. The multiplexers 202-208 allow any of the possible N-bit sequences to be available within a single clock cycle.

The input to the A and B ports of the output sequence ordering function circuit 114 is controlled by a pair of multiplexers 112, 118 that select either an inverted or non-inverted version of the Walsh table output. For the purposes of this discussion those two multiplexers 112, 118, are designated the "sequence inversion" multiplexers. The control of these multiplexers is performed by an algorithm that uses the higher order bits (e.g., bits $\log_2(Y)-1$ down to $\log_2(X)-1$) that were not used in either the Walsh symbol index and the starting bit index.

Because the present invention allows the generation of any X-bit sequence with any random starting bit, it requires two consecutive X-bit sequences from which to select the particular X-bit output sequence of interest. With respect to the prior art algorithm previously described, two separate calculations need to be performed to determine sequence inversion, one for the first X-bit sequence, and another for the next X-bit sequence that follows the first. The first calculation is performed as described in the background section, the second calculation is performed exactly in the same manner, but the upper order bits of the starting bit index are incremented by one. The incrementing is required because we are indexing the block of X bits immediately following the block that was indexed based on the starting bit index. The value of the upper bits of that index would be exactly one greater than those of the starting bit index.

Referring now to FIG. 3, this specific implementation of the invention is provided as an example in order to better understand the functioning of the invention. This particular implementation selects a 4-bit sequence out of a 128-bit long Walsh code. A 7-bit index is used to select the desired 128-bit Walsh symbol, and a 7-bit index is used to select the desired starting bit location within the 128-bit Walsh symbol that begins the 4-bit sequence that we want to extract. The two lowest order bits (1:0) of the Walsh symbol index are used to address the look-up table 110. Only 2 bits are required because the table has only 4 addresses since it contains a 4×4 matrix.

Bits (6:2) of the Walsh symbol index are used to control the "sequence inversion" multiplexers 112, 118. The two lowest order bits (1:0) of the starting bit index are used to configure the multiplexers in the output sequence ordering function circuit 114 in order to select the desired 4-bit output sequence. Bits (6:2) of the starting bit index are also used (in an incremented version and non-incremented version) to control the "sequence inversion" multiplexers 112, 118 using the algorithm described in the background section. The non-incremented version is used for input A and the incremented version is used for input B to the output sequence generating function circuit 114. The incrementing circuit 104 provides the necessary incrementation.

A simple example using a Walsh index value of "0000101" and a starting bit index of "0001010" will clearly illustrate the concepts described above as illustrated in FIG. 3. The address into the Walsh table 110 is "01", from bits 1:0 of the Walsh index value 102. The algorithm to determine the "sequence inversion" values logically ANDs "00001" with "00010" for the non-incremented calculation, and logically ANDs "00001" with "00011" for the incremented calculation. After logically Exclusive-Oring the results of the AND function together using logic blocks 106, 108, the non-incremented calculation produces a "0" (don't invert) result and the incremented calculation produces a "1" (invert) result. This control the multiplexers 112, 118, so that a non-inverted version of the table output is provided to input A and an inverted version of the table output is provided to input B of the output sequence ordering function block 114.

The output sequence ordering function multiplexers are controlled as follows: if the control value is "00" the top input to each of the four multiplexers is selected, a control value of "01" selects the next input down, a control value of "10" selects the input below that, and a control value of "11" selects the bottom input to each multiplexer. The numbers associated with the inputs to the output multiplexers represent the bit positions of the values applied to the A and B inputs. The lowest two bits of the starting bit index value ("10") select the output bit ordering. The numbers on the multiplexers found in the output sequence ordering function block 114 correspond to the bit positions of the A and B input ports.

In the general case, if we define the Walsh code length to be Y, the Walsh table size to be X, and the output vector size to be N, the following relationships apply for the bit widths of the various elements in the invention:

1). There are $\log_2(Y)$ Walsh symbol index bits and starting bit index bits. It is a property of Walsh codes that Y will always be a power of 2.

2). The Walsh table must be X by X, where X is a power of 2. The value of N does not need to be a power of two, but X must be equal to or greater than N. Walsh symbol index bits $\log_2(X)-1$ down to 0 are used to address the Walsh table.

3). Walsh symbol index bits and starting bit index bits $\log_2(Y)-1$ down to $\log 2(X)$ are used to control the "sequence inversion" multiplexers 112, 118 using the algorithm described in the background section.

4). Starting bit index bits $\log_2(X)-1$ down to 0 are used to control the output sequence ordering function multiplexers.

The present invention provides several advantages including that the number of bits provided per request cycle is variable, thereby maximizing the efficiency of each request cycle. Also, any starting point in the sequence can be accessed within a single clock cycle, eliminating the need for shifting of registers to the desired starting point. A new sequence with a new starting point may be accessed every clock cycle, and requests can be serviced at a rate of one request per clock cycle, maximizing data throughput rates.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A vector based Walsh code bit sequence generator providing an output sequence from a Y-bit length sequence, comprising:
   an input port for receiving an X-bit length Walsh symbol index used for selecting the desired starting bit location in the Y-bit length sequence;
   a storage area coupled to the input port, the storage area having an output port; a sequence inversion circuit coupled to the output port of the storage area;
   an output sequence ordering function circuit coupled to the sequence inversion circuit, the output sequence ordering function circuit having an output port for providing an output; and
   some of the bits from the X-bit length Walsh symbol index are used to address the storage area.

2. A vector based Walsh code bit sequence generator as defined in claim 1, wherein the storage area comprises a Read-Only memory (ROM).

3. A vector based Walsh code bit sequence generator as defined in claim 1, wherein the sequence inversion circuit comprises two multiplexers.

4. A vector based Walsh code bit sequence generator as defined in claim 1, wherein the output sequence ordering function circuit comprises a plurality of multiplexers.

5. A vector based Walsh code bit sequence generator as defined in claim 1, wherein the storage area stores Walsh codes and the lower log2(X) bits of the Walsh symbol index determines which of the Walsh codes is addressed in the storage area.

6. A vector based Walsh code bit sequence generator as defined in claim 1, wherein the sequence inversion circuit generates a sequence of 2X bits that is input to the output sequence ordering function circuit.

7. A vector based Walsh code bit sequence generator as defined in claim 3, further comprising first and second logic circuits receiving at least some of the bits from the X-bit length Walsh symbol index, and each logic circuit providing a control signal to a corresponding one of the two multiplexers.

8. A vector based Walsh code bit sequence generator as defined in claim 1, further comprising: an input port for receiving a starting bit index signal; and an incrementing circuit coupled to the input port for incrementing at least some of the bits of the starting bit index signal are incremented.

9. A vector based Walsh code sequence generator as defined in claim 8, wherein the output sequence ordering function circuit comprises a plurality of multiplexers and at least some of the bits from the starting bit index signal are used to control the plurality of multiplexers.

10. A vector based Walsh code sequence generator as defined in claim 1, wherein the output sequence ordering function circuit includes first and second inputs and the sequence inversion circuit provides a non-inverted version of the storage area output to the first input and an inverted version of the storage area output to the second input.

11. A method for vector based Walsh code sequence generation in an apparatus for providing an output from a Y-bit length Walsh symbol index using a Walsh storage area of size X, comprising the steps of:
   a) receiving a starting bit index having a predetermined number of bits;
   b) using the starting bit index to select the desired starting bit location in the Y-bit length Walsh symbol index;
   c) using some of the bits of the Y-bit Walsh symbol index to address the Walsh storage area; and
   d) using some of the bits of the starting bit index to control an output sequence ordering function that provides the output.

12. A method as defined in claim 11, wherein X is a power of 2 that is greater than or equal to N.

13. A method as defined in claim 11, wherein the Walsh symbol index bits $\log_2(X)-1$ through 0 are used to access the storage area.

14. A method as defined in claim 13, wherein starting bit index bits $\log_2(X)-1$ through 0 are used to control the output sequence ordering function.

15. A method as defined in claim 11, wherein Walsh symbol index bits and starting bit index bits $\log_2(X)-1$ through $\log_2(X)$ are used to control the sequence inversion.

* * * * *